R. E. HELLMUND.
SYSTEM OF CONTROL.
APPLICATION FILED OCT. 16, 1918.
1,344,763.
Patented June 29, 1920.
Fig. 1.
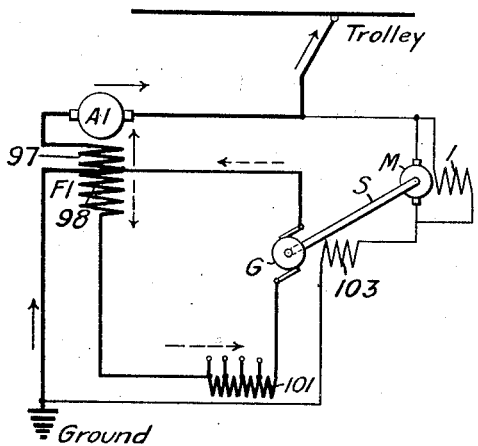
Fig. 2.
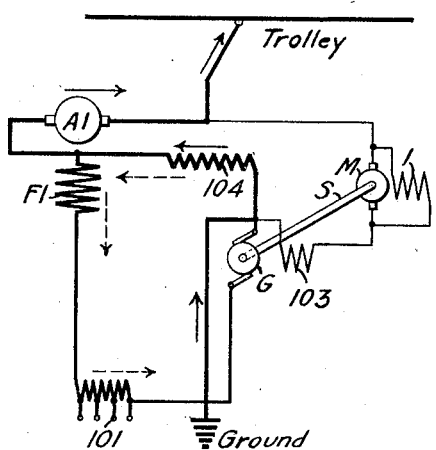
Fig. 3.
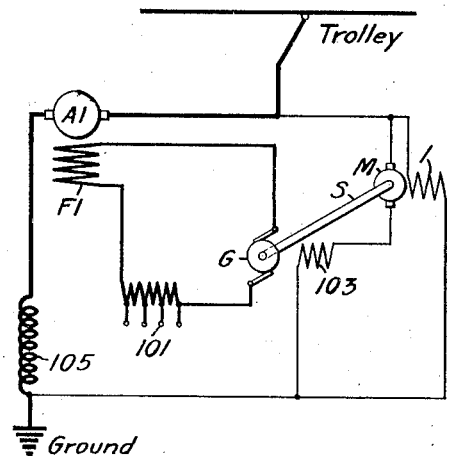
Fig. 4.
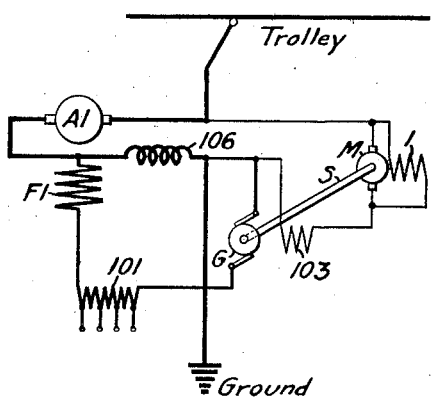
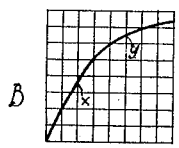
Fig. 5.
WITNESSES
Hazel J. Shelhamer
W. P. Coley
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,344,763.   Specification of Letters Patent.   Patented June 29, 1920.

Original application filed October 24, 1916, Serial No. 127,381. Divided and this application filed October 16, 1918. Serial No. 258,442.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control, of which the following is a specification, this application being a division of application Serial No. 127,381, filed October 24, 1916, patented October 28, 1919, No. 1,320,053.

My invention relates to systems of control for dynamo-electric machines, and it has special relation to the regenerative control of electric motors that are adapted for use in propelling electric railway vehicles and the like.

One object of my invention is to provide simple, durable, and reliable means for effecting regenerative operation of the momentum-driven armatures of motors of the above-indicated character, whereby a certain proportion of the energy absorbed during the propelling period is returned to the supply circuit, to reduce operating expenses, and whereby various other well-known operating advantages are secured.

Another object of my invention is to provide a system of regenerative control which shall embody means for automatically compensating for the unavoidable voltage fluctuations in the supply-circuit voltage, whereby a substantially constant regenerated current is maintained during such fluctuations.

More specifically stated, an object of my invention is to provide a motor-generator set or dynamotor of relatively small capacity for variably energizing the main series field magnet winding of the propelling motor or motors during regenerative operation. The set may be driven either from a predetermined portion of the regenerative circuit or from a suitable external source of energy.

Viewed from another angle, it is an object of my invention to provide a regenerative system employing substantially constant main-field winding excitation that is substantially independent of the supply circuit voltage, but is dependent upon the regenerated current for purposes to be set forth.

The various novel circuit arrangements and connections employed in my invention may best be understood by reference to the accompanying drawings, in which Figures 1 to 4, inclusive, are diagrammatic views of the main circuit connections of various control systems embodying my invention; and Fig. 5 is a curve chart serving to illustrate certain operating characteristics of the invention.

Like reference characters designate like parts in all of the figures.

The systems to be set forth are relatively simple in arrangement by reason of the fact that either a motor-generator or a battery alone is used in connection with the main-field-winding excitation, whereas, in many prior systems, both are utilized. Moreover, in such prior systems wherein the main-field-winding excitation is entirely independent of the trolley voltage, the unavoidable fluctuations of trolley voltage may, at times, produce undesirable effects, particularly in the case of a sudden interruption of supply-circuit voltage, when relatively heavy currents may occur for an instant.

On the other hand, in systems of the class wherein the main field-winding-excitation voltage is dependent upon the supply-circuit voltage, so that such excitation varies with the supply-circuit voltage and thus, the above-mentioned excessive currents cannot occur, the system is inherently adapted to produce undesirably high regenerated voltage upon a sudden decrease or interruption of supply-circuit voltage, since the inherent tendency, in many systems, is to maintain a main-field-winding excitation that is sufficient to provide a main armature or regenerated voltage that is higher than the normal supply-circuit voltage by a predetermined amount. Particularly, in systems that employ a motor-generator set or the like that is driven from the regenerated voltage, the cycle of operation is such as to successively increase the regenerated voltage that is supplied to the motor-generator set and thus increase the main-field-winding excitation and, therefore, the main-armature or regenerated voltage. Under such conditions, a dangerously high regenerated voltage is liable to be attained in the course of a second or so, thereby leading to "flash-over" troubles and the like in the main motors or in the driving motor of the auxiliary motor-generator set.

A compromise system which embodies the good features of both of the above-mentioned classes of systems may be obtained by making the main-field-winding excitation normally substantially independent of the supply-circuit voltage, and by preventing excessive regenerated currents, either by making such excitation dependent upon the regenerated current in a suitable manner or by making such excitation only temporarily dependent upon the supply-circuit voltage, until relays or other control devices have been given time to operate and either interrupt the circuit connections, or change them to correspond to the new values of supply-circuit voltage. This compromise feature is embodied in the following systems.

Referring to Fig. 1 of the drawings, the system here shown comprises a supply circuit that includes a supply conductor marked "Trolley" and a return circuit conductor marked "Ground;" a dynamo-electric machine, such as a direct-current railway motor, for example, having an armature A1 and a series-type field winding F1; and an auxiliary motor-generator set comprising a motor M that is supplied with propelling energy from the supply circuit and a generator or exciter G, that is suitably mechanically connected to the motor M, as by a shaft S.

In the present system, the field winding F1 is divided into a larger portion 98 and a smaller continuous portion 97.

The auxiliary driving motor is provided with a shunt field winding 1 and is connected in series relation with a field-magnet winding 103 for the auxiliary generating armature, across the supply circuit. The generating armature is connected through a variable resistor 101 across the main field-winding section 98.

As indicated by the respective solid and dotted arrows, the main armature or regenerated current traverses the smaller field-winding section 97 in the same direction as it traverses the main armature A1, whereas the auxiliary current that is supplied by the generator armature flows through the larger field-winding portion 98 differentially with respect to the main current in the smaller field-winding section 97.

Thus, the desired negative compounding effect is obtained in the system under consideration for the following reasons: the normal excitation that is supplied by the main field winding F1, for example, is the resultant flux that is produced by the differentially-related sections 97 and 98. In case of an incipient increase of main-armature or regenerated current, the effect of the smaller field-winding section 97 will be increased to correspondingly reduce the total effective field-winding flux, and thus, the regenerated current is inherently reduced to the desired normal value. The converse action, of course, takes place in case of an incipient decrease of regenerated current.

To compensate for the gradual decrease of vehicle speed during the regenerative period, the field-winding circuit resistor 101 may be gradually excluded from circuit in any suitable manner to thereby correspondingly increase the effective main-field-winding excitation.

The purpose of the above-mentioned location of the auxiliary field winding 103 is to hasten the desired counteracting variations of the main-field-winding excitation by making it temporarily dependent upon changes of the supply-circuit voltage. In general, the design of parts of the motor-generator set corresponds to that set forth in connection with Fig. 13 and the curve of Fig. 14 in the above-identified application of which this is a division. More specifically considered, the present Fig. 5 corresponds to the above-mentioned Fig. 14 of the parent application. The curve represents the familiar B—H or magnetization curve of the magnetic circuit for the field winding of the auxiliary motor. This magnetic circuit is so designed and proportioned that it is not normally saturated and, consequently, with varying supply-circuit voltage, the magnetic conditions in the auxiliary motor inherently and immediately vary correspondingly to maintain a substantially constant motor speed. As is well-known, main dynamo-electric machines and, in particular, auxiliary driving motors, of the class in question normally have their field-winding magnetic circuits relatively highly saturated; that is to say, the machines operate with a normal degree of saturation that corresponds to the point Y in the curve which is located above the bend or knee thereof. In the present instance, however, the auxiliary driving motor is adapted to operate with a degree of field-winding magnetic-circuit saturation that is relatively low and corresponds to the point X of the curve, which is located upon the straight-line portion thereof below the bend or knee. Thus, the auxiliary driving motor inherently possesses relatively great stability and is economical in operation, as will be appreciated by those skilled in the art. On the contrary, the magnetic circuit for the field winding of the auxiliary generating armature G is preferably saturated to a relatively high degree, so that, with the practically constant-speed conditions under which the motor-generator set operates, the exciter voltage tends to remain substantially constant.

In addition, in case of an increase or upward fluctuation of the supply-circuit voltage, the current traversing the circuit that includes the auxiliary driving armature winding M and the field winding 103 for the generator armature G is correspondingly increased to thus augment the delivered voltage of the armature G and finally, therefore, to increase the effective flux that is produced by the total field winding F1. In this way, the regenerated voltage of the main armature A1 is raised a predetermined amount in a relatively short space of time to thus tend to maintain a substantially constant difference between the main-armature voltage and the supply-circuit voltage, whereby a practically constant regenerated current is supplied. The converse action occurs upon a decrease of supply-circuit voltage, as will be understood.

Referring to Fig. 2, the auxiliary motor-generator set is constructed and arranged similarly to that set forth in connection with Fig. 1, but the grounded terminal of the generating armature winding G is connected through a resistor 104, of preferably fixed value, to the upper terminal of the main field winding F1. Consequently, the desired negative compounding effect is obtained in the manner set forth below, while, in addition, the hastening action of the auxiliary field winding 103 in the case of supply-circuit-voltage fluctuations is obtained. To compensate for the decrease of vehicle speed, the resistor 101, or, if desired, the resistor 104, may be gradually excluded from circuit, as previously described.

The negative compounding effect mentioned above may be briefly explained as follows: as indicated by the solid and the dotted arrows, respectively, the main-armature or regenerated current traverses the resistor 104 in the same direction as the main-field-winding or exciting current. Consequently, an incipient increase of regenerated current correspondingly increases the voltage drop across the resistor 104, thus proportionately reducing the voltage available for delivery to the main field-winding F1 from the auxiliary generating armature, and likewise decreasing the main-machine excitation to cause the regenerated current to subside to a normal value. The converse action takes place in the event of an incipient decrease of main-armature current.

In Fig. 3, the main field winding F1 is connected through the variable resistor 101 across the auxiliary generating armature winding G, being entirely disconnected from the main-armature circuit, which includes an inductive device 105 in series relation with the main armature A1.

The auxiliary motor-armature winding M is provided with a field winding 1 which is connected across the supply circuit, while the generating armature G is again provided with the field winding 103 that is connected in series relation with the auxiliary motor armature M.

With a design of the motor-generator set that corresponds to that set forth in connection with the above-mentioned Fig. 13 and the curve of Fig. 14, the main-field-winding excitation is thus substantially independent of the supply-circuit voltage as well as of the regenerated current, but is temporarily dependent upon fluctuations of supply-circuit voltage by reason of the utilization of the field winding 103 for the auxiliary generator armature.

The result of such an arrangement is to provide the regenerating machine with a relatively flat speed-torque characteristic curve, that is to say, a slight change of vehicle speed will produce a considerably greater variation of torque, which condition is sometimes desired, and yet, sudden overloads or surges of current will be prevented, and relay devices or the like will have sufficient time to operate under emergency conditions, such as the interruption of supply-circuit voltage.

The purpose of the inductive device 105 is to act as a further preventive of sudden and material changes of regenerated current by reason of its well-known choke-coil effect, although, in many cases, the use of such an inductive device will not be necessary to the satisfactory operation of the system.

Fig. 4 shows a system in which certain desirable operating features of the system that is shown in Fig. 1 are combined with others; that is to say, the auxiliary field winding 103 for the generator armature G is utilized to provide the previously explained hastening action upon the main-field-winding excitation changes in the case of supply-circuit-voltage fluctuations, and, in addition, an inductive device 106, corresponding to the resistor 104 of Fig. 2, is connected in the common portion of the main-armature and main-field-winding circuits to inherently produce the desired negative compounding effect, as previously explained. This effect is a temporary one, by reason of the well-known inductive "kick" that occurs upon sudden changes of current conditions. The motor-generator set is of the special type hereinbefore set forth in connection with the curve of Fig. 14 of the above-identified parent application; that is, the auxiliary motor has a relatively unsaturated field-magnetic circuit, whereas, the corresponding circuit of the auxiliary generator is relatively highly saturated. To compensate for the decrease of vehicle speed, the variable field-winding-circuit resistor 101 may be gradually excluded from circuit, or other previously described methods may be employed.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of regenerative control, the combination with a supply circuit and a dynamo-electric machine having an armature and a field winding, of a source of current normally substantially independent of supply-circuit voltage fluctuations for exciting said field winding, and means temporarily influenced by such fluctuations to affect the field-winding excitation.

2. In a system of regenerative control, the combination with a supply circuit and a main dynamo-electric machine having an armature and a field winding, of auxiliary dynamo-electric means for exciting said field winding, said means being normally substantially independent of supply-circuit voltage fluctuations, but having its component windings arranged to be temporarily influenced by such fluctuations to affect the field-winding excitation.

3. In a system of regenerative control, the combination with a supply circuit and a main dynamo-electric machine having an armature and a field winding divided into two portions, of an auxiliary motor-generator having one of its armatures connected to excite one of said portions to produce a flux in a certain direction, the main-armature current traversing the other portion to create a flux in the opposite direction, and a field winding for one of the auxiliary armatures being connected in series relation with the other auxiliary armature.

4. In a system of regenerative control, the combination with a supply circuit and a main dynamo-electric machine having an armature and a field winding divided into two portions, of an auxiliary motor-generator having one of its armatures driven from the supply circuit and the other connected to excite one of said portions in a certain direction, the main-armature current exciting the other portion in the opposite direction, and a field winding for the auxiliary exciting armature being connected in series relation with the auxiliary driving armature.

5. In a system of regenerative control, the combination with a supply circuit and a main dynamo-electric machine having an armature and a field winding, of an auxiliary motor-generator having one of its armatures driven from the supply circuit and the other connected to separately excite said field winding, the magnetic circuit of the auxiliary driving motor being relatively unsaturated and the magnetic circuit of the auxiliary exciting armature being relatively highly saturated, and a field winding for the exciting armature being connected in series relation with the auxiliary driving armature.

6. In a system of regenerative control, the combination with a supply circuit and a dynamo-electric machine having an armature and a sub-divided field winding, of a plurality of auxiliary mechanically-connected armatures for respectively acting as driving means and as an exciter for one portion of the main field winding, the driving and the exciting armatures being respectively provided with a shunt field winding and with a field winding connected in series relation with said driving armature.

7. In a system of regenerative control, the combination with a supply circuit and a dynamo-electric machine having an armature and a sub-divided field winding, of means for varying the field-winding-excitation in the opposing direction to changes of armature current including a source of energy for exciting one portion of the field winding, and means only temporarily influenced by supply-circuit-voltage fluctuations for hastening a counter-acting variation of field-winding excitation.

In testimony whereof, I have hereunto subscribed my name this 30th day of Sept., 1918.

RUDOLF E. HELLMUND.